(12) United States Patent
McgarityBashiri et al.

(10) Patent No.: US 11,865,621 B2
(45) Date of Patent: Jan. 9, 2024

(54) ADDITIVELY MANUFACTURED JOURNAL BEARING FOR A WIND TURBINE GEARBOX

(71) Applicant: General Electric Company, Schenectady, NY (US)

(72) Inventors: Hayden McgarityBashiri, Springdale, OH (US); Aaron Wertz, Cincinnati, OH (US); Kevin M. Vandevoorde, Cincinnati, OH (US); Raed Zuhair Hasan, Greenville, SC (US); Priyangu C. Patel, Simpsonville, SC (US); John P. Davis, Duanesburg, NY (US); Ganesh Raut, Bangalore (IN)

(73) Assignee: General Electric Company, Schenectady, NY (US)

( * ) Notice: Subject to any disclaimer, the term of this patent is extended or adjusted under 35 U.S.C. 154(b) by 338 days.

(21) Appl. No.: 17/254,362

(22) PCT Filed: Jun. 25, 2019

(86) PCT No.: PCT/US2019/038888
§ 371 (c)(1),
(2) Date: Dec. 21, 2020

(87) PCT Pub. No.: WO2020/005872
PCT Pub. Date: Jan. 2, 2020

(65) Prior Publication Data
US 2021/0270358 A1 Sep. 2, 2021

(30) Foreign Application Priority Data

Jun. 25, 2018 (IN) .............................. 201841023629

(51) Int. Cl.
*B22F 10/25* (2021.01)
*B29C 64/393* (2017.01)
(Continued)

(52) U.S. Cl.
CPC .............. *B22F 5/009* (2013.01); *B22F 10/14* (2021.01); *B22F 10/25* (2021.01); *B22F 10/28* (2021.01);
(Continued)

(58) Field of Classification Search
CPC .......... B22F 5/009; B22F 10/14; B22F 10/25; B22F 10/28; B22F 10/40; B22F 10/85;
(Continued)

(56) References Cited

U.S. PATENT DOCUMENTS 2,688,263 A 9/1954 Rockwell
3,154,970 A 11/1964 Gebhardt et al.
(Continued)

FOREIGN PATENT DOCUMENTS

CA 2679726 A1 11/2009
CN 103185132 A 7/2013
(Continued)

OTHER PUBLICATIONS

ISO/ ASTM52900-15 Standard Terminology for Additive Manufacturing—General Principles—Terminology, XP055374490, ASTM International, Standards & Publications, Standard Products, vol. 10.04, Jan. 1, 2015. (Year: 2015).*
(Continued)

*Primary Examiner* — Lawrence Averick
(74) *Attorney, Agent, or Firm* — Dority & Manning, P.A.

(57) ABSTRACT

A method for manufacturing a gear assembly of a gearbox in a wind turbine includes providing a pin shaft of the gear assembly. The method also includes depositing material onto an exterior surface of the pin shaft of the gear assembly via an additive manufacturing process driven by a computer numerical control (CNC) device to form a bearing that circumferentially surrounds and adheres to the pin shaft.
(Continued)

Further, the method includes providing a gear circumferentially around the bearing to form the gear assembly.

12 Claims, 9 Drawing Sheets

(51) Int. Cl.
| | | |
|---|---|---|
| *B29L 31/04* | (2006.01) | |
| *B29C 64/124* | (2017.01) | |
| *B22F 7/08* | (2006.01) | |
| *B22F 5/00* | (2006.01) | |
| *B33Y 10/00* | (2015.01) | |
| *B33Y 80/00* | (2015.01) | |
| *F03D 15/00* | (2016.01) | |
| *F03D 80/70* | (2016.01) | |
| *F16C 17/02* | (2006.01) | |
| *F16C 33/10* | (2006.01) | |
| *F16C 33/12* | (2006.01) | |
| *B22F 10/14* | (2021.01) | |
| *B22F 10/28* | (2021.01) | |
| *B22F 10/40* | (2021.01) | |
| *B33Y 50/02* | (2015.01) | |
| *B22F 10/85* | (2021.01) | |
| *B22F 12/90* | (2021.01) | |

(52) U.S. Cl.
CPC ............ *B22F 10/40* (2021.01); *B29C 64/124* (2017.08); *B33Y 10/00* (2014.12); *B33Y 80/00* (2014.12); *F03D 15/00* (2016.05); *F03D 80/70* (2016.05); *F16C 17/02* (2013.01); *F16C 33/1065* (2013.01); *F16C 33/12* (2013.01); *B22F 10/85* (2021.01); *B22F 12/90* (2021.01); *B29C 64/393* (2017.08); *B29L 2031/04* (2013.01); *B33Y 50/02* (2014.12); *F05B 2230/30* (2013.01); *F05B 2240/50* (2013.01); *F05B 2260/40311* (2013.01); *F16C 2223/80* (2013.01); *F16C 2360/31* (2013.01)

(58) Field of Classification Search
CPC .... B22F 12/90; B22F 5/08; B22F 7/08; B29C 64/124; B29C 64/393; B33Y 10/00; B33Y 80/00; B33Y 50/02; F03D 15/00; F03D 80/70; F16C 17/02; F16C 33/1065; F16C 33/12; F16C 2223/80; F16C 2360/31; F16C 2223/42; F16C 2223/46; F16C 2361/61; B29L 2031/04; F05B 2230/30; F05B 2240/50; F05B 2260/40311; Y02E 10/72; Y02P 10/25; Y02P 70/50
See application file for complete search history.

(56) References Cited

U.S. PATENT DOCUMENTS

| | | | |
|---|---|---|---|
| 3,303,713 A | 2/1967 | Hicks | |
| 3,352,178 A | 11/1967 | Lindgren et al. | |
| 3,943,787 A | 3/1976 | Hicks | |
| 4,104,933 A | 8/1978 | Campbell | |
| 4,504,554 A | 3/1985 | Yoshioka et al. | |
| 6,422,970 B1 | 7/2002 | Paroli | |
| 6,883,235 B2 | 4/2005 | Bell | |
| 8,147,145 B2* | 4/2012 | Inoue .................. | F16C 33/1085 |
| | | | 384/316 |
| 8,235,861 B2 | 8/2012 | Lopez et al. | |
| 8,376,902 B2 | 2/2013 | Fox et al. | |
| 8,430,788 B2 | 4/2013 | Fox et al. | |
| 8,591,371 B2 | 11/2013 | Dinter et al. | |
| 8,672,797 B2 | 3/2014 | Fox | |
| 8,690,539 B2 | 4/2014 | Hohle et al. | |
| 8,702,558 B2 | 4/2014 | Smook | |
| 8,758,190 B2 | 6/2014 | Montestrue | |
| 8,920,284 B2 | 12/2014 | Fox | |
| 8,961,362 B2 | 2/2015 | Fox et al. | |
| 9,103,413 B2 | 8/2015 | Curti et al. | |
| 9,162,423 B2 | 10/2015 | Boeschen et al. | |
| 9,435,376 B2 | 9/2016 | Gaertner et al. | |
| 9,458,880 B2 | 10/2016 | Kari et al. | |
| 9,713,843 B2 | 7/2017 | Snyder et al. | |
| 10,330,174 B2* | 6/2019 | Nies ..................... | B23P 15/14 |
| 10,682,705 B2 | 6/2020 | Nies | |
| 2003/0008748 A1 | 1/2003 | Fox | |
| 2008/0194378 A1 | 8/2008 | Fox | |
| 2009/0238506 A1* | 9/2009 | Inoue ..................... | F16C 17/02 |
| | | | 384/291 |
| 2010/0197444 A1 | 8/2010 | Montestruc | |
| 2011/0171026 A1 | 7/2011 | Kolpin et al. | |
| 2012/0009811 A1 | 1/2012 | He et al. | |
| 2012/0028755 A1 | 2/2012 | Erno et al. | |
| 2012/0108380 A1 | 5/2012 | Dinter et al. | |
| 2012/0184404 A1 | 7/2012 | Chobot et al. | |
| 2013/0337967 A1 | 12/2013 | Kleine-Brockhoff et al. | |
| 2014/0141930 A1 | 5/2014 | Gerke et al. | |
| 2016/0023272 A1 | 1/2016 | Mongillo, Jr. et al. | |
| 2016/0298751 A1 | 10/2016 | McCune | |
| 2018/0195559 A1 | 7/2018 | Hallman | |
| 2018/0241289 A1 | 8/2018 | Desbiens et al. | |
| 2019/0136945 A1* | 5/2019 | Nies ..................... | F16H 1/2836 |
| 2021/0404548 A1* | 12/2021 | Sheppard ............ | F16H 57/0427 |

FOREIGN PATENT DOCUMENTS

| | | |
|---|---|---|
| CN | 103185132 A | 7/2013 |
| CN | 105522155 A | 4/2016 |
| CN | 105522155 A | 4/2016 |
| CN | 105829078 A | 8/2016 |
| CN | 105829078 A | 8/2016 |
| CN | 105829741 A | 8/2016 |
| CN | 105829741 A | 8/2016 |
| CN | 105899826 A | 8/2016 |
| CN | 105899826 A | 8/2016 |
| CN | 106460939 A | 2/2017 |
| CN | 106499439 A | 3/2017 |
| CN | 106499439 A | 3/2017 |
| CN | 107178600 A | 9/2017 |
| CN | 107178600 A | 9/2017 |
| GB | 274396 A | 7/1927 |
| IN | 201000506 I2 | 9/2016 |
| JP | 2008196702 A | 8/2008 |
| WO | WO 00/23718 A1 | 4/2000 |
| WO | WO2009/102853 A1 | 8/2009 |
| WO | WO2012/165928 A2 | 12/2012 |
| WO | WO2018074391 A1 | 4/2018 |
| WO | WO 2018074391 A1 | 4/2018 |
| WO | WO2019178630 A1 | 9/2019 |

OTHER PUBLICATIONS

PCT International Search Report & Written Opinion Corresponding to PCTUS2019/038888 dated Sep. 17, 2019.
The Foreign Office Action with translation for CN application No. 201980042712.0, dated Jun. 1, 2022.
ISO/ASTM 52900:2015 Additive manufacturing—General principles—Terminology, Revised by ISO/ASTM 52900:2021, International Organization for Standardization, Nov. 2021, (Abstract Only) Retrieved from the internet: https://www.iso.org/standard/74514.html Document preview available: https://www.iso.org/obp/ui/en/#iso:std:74514:en.

* cited by examiner

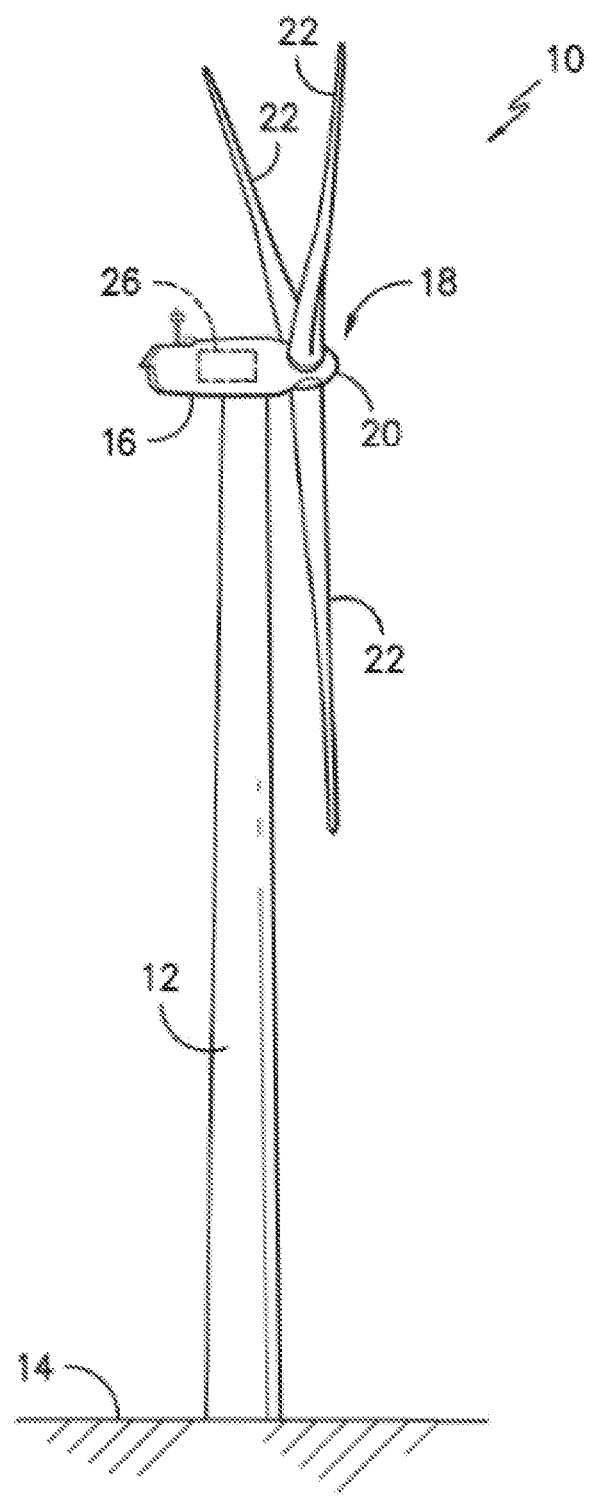
FIG. -1-

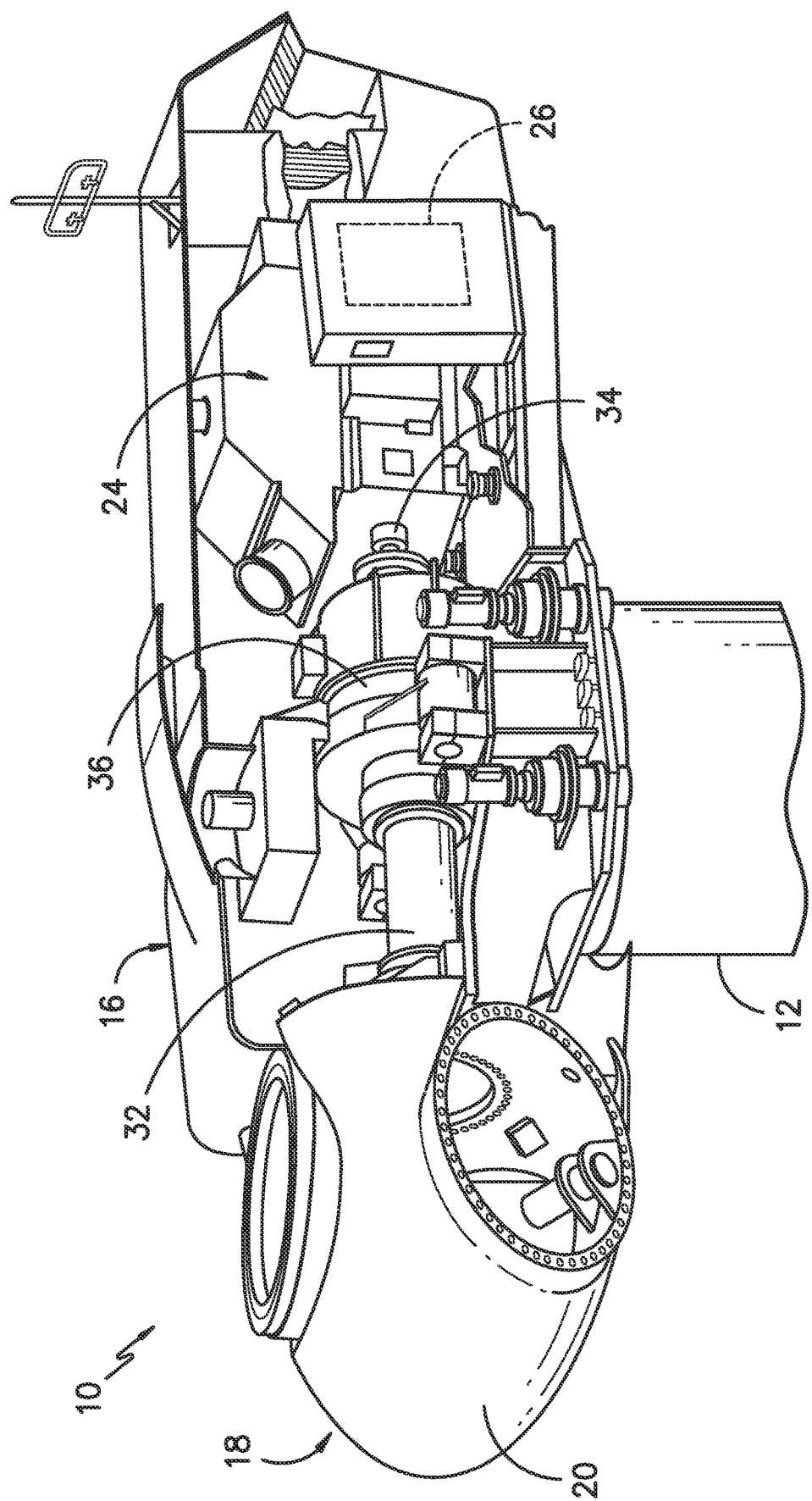
FIG. -2-

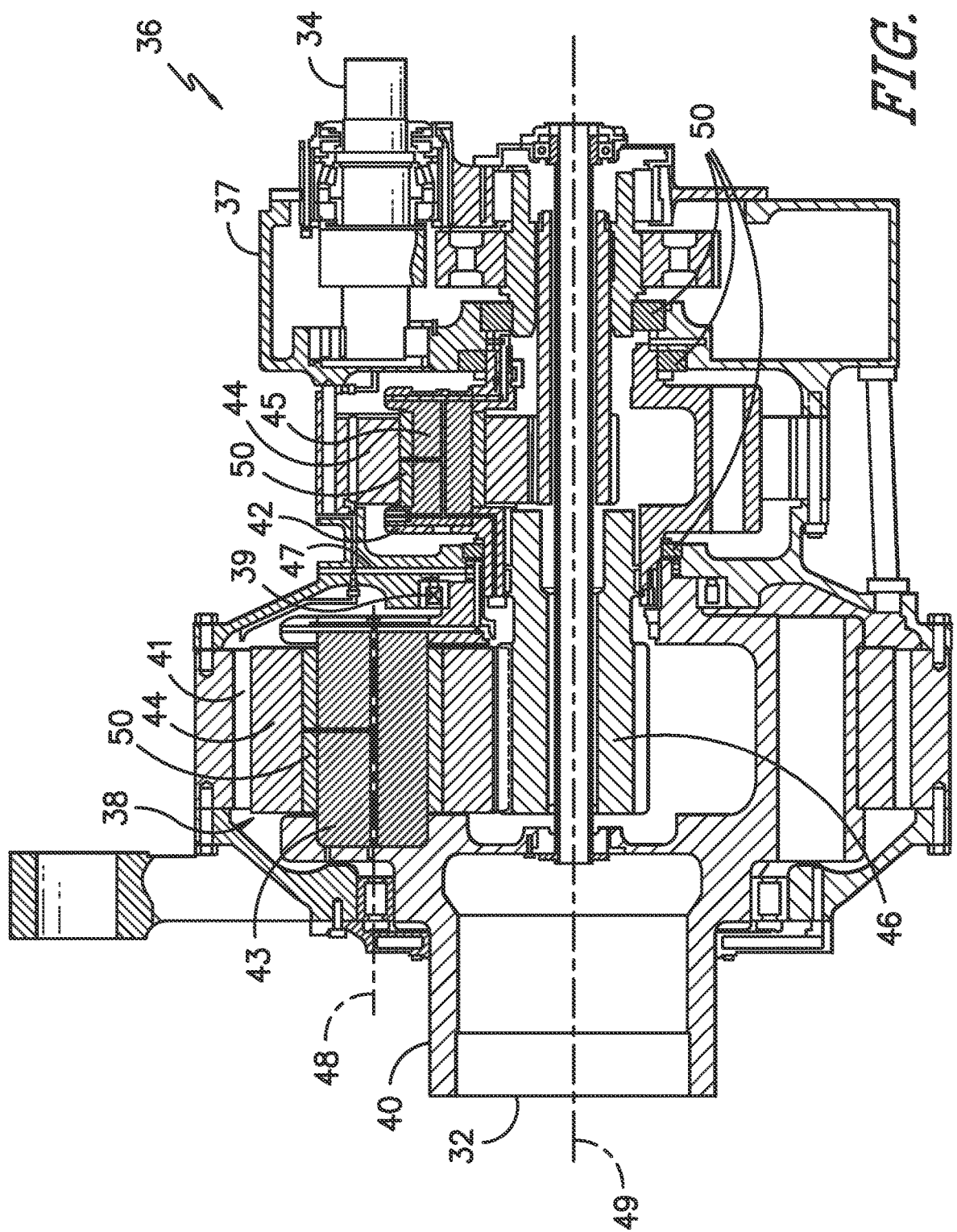

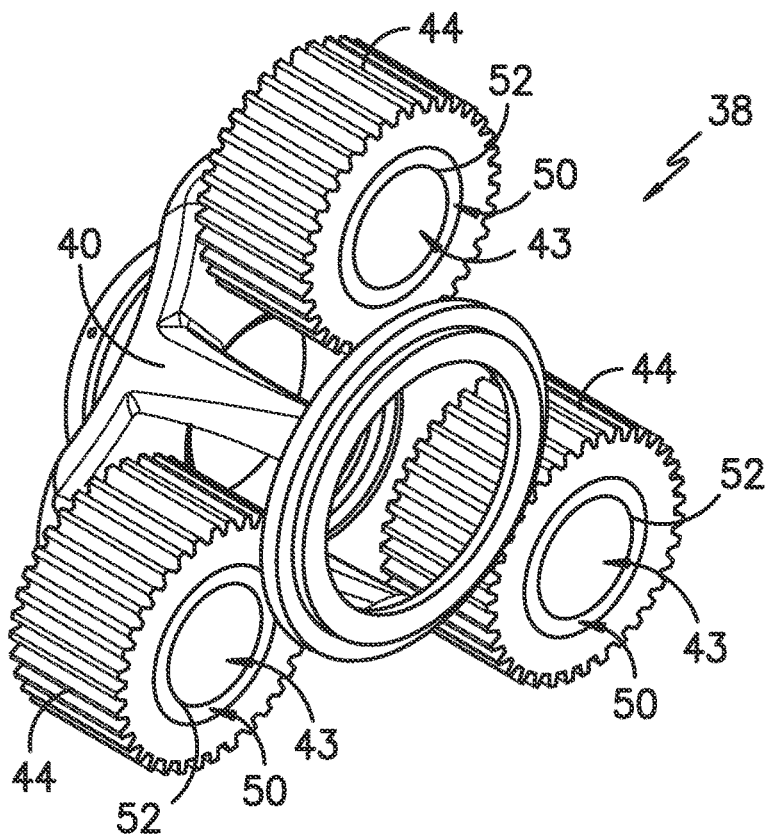
FIG. -4-
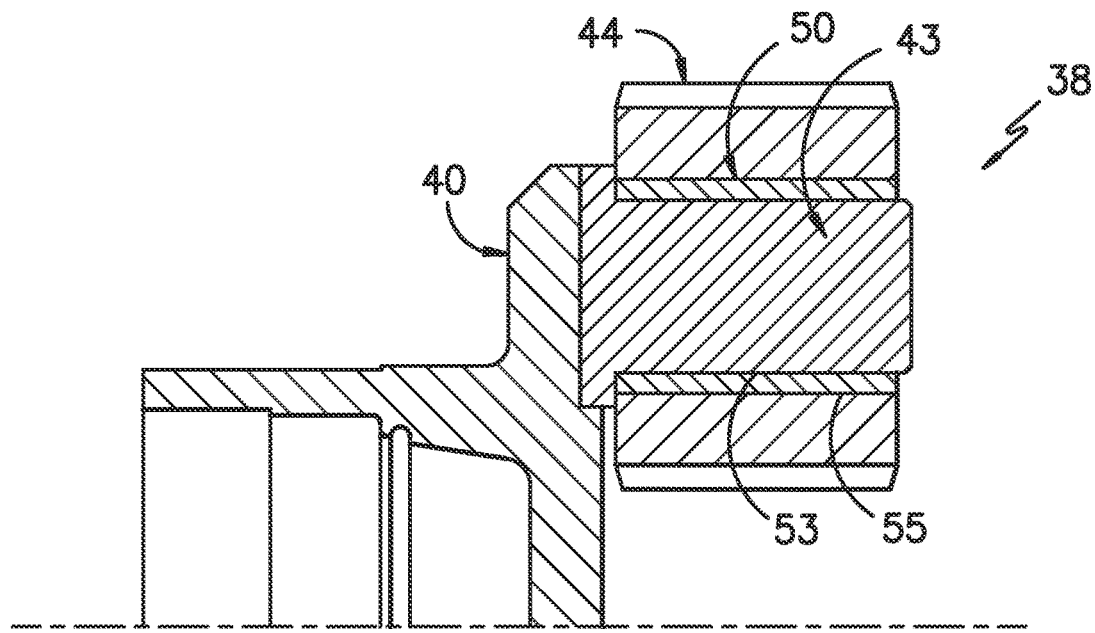
FIG. -5-

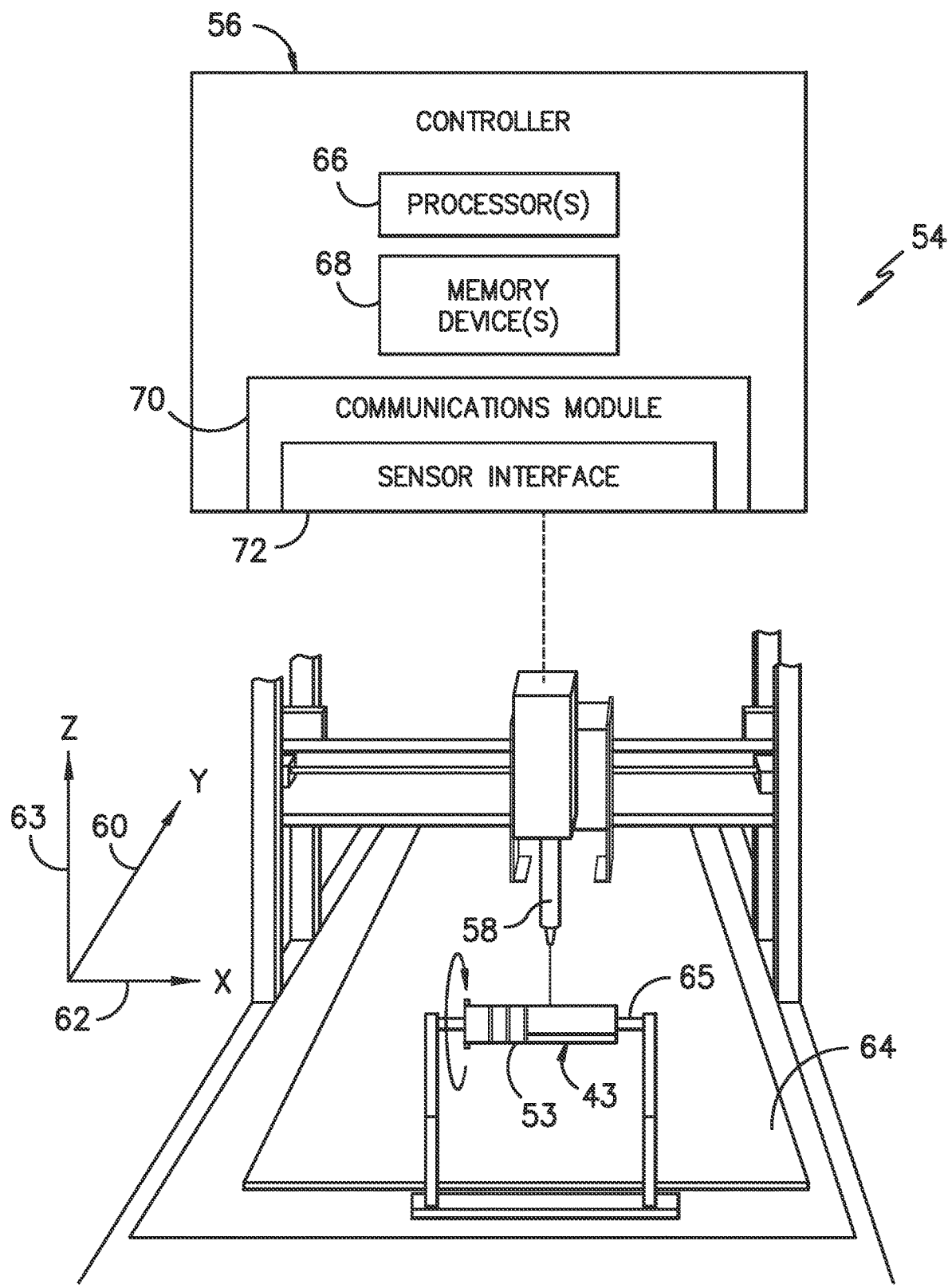
FIG. -6-

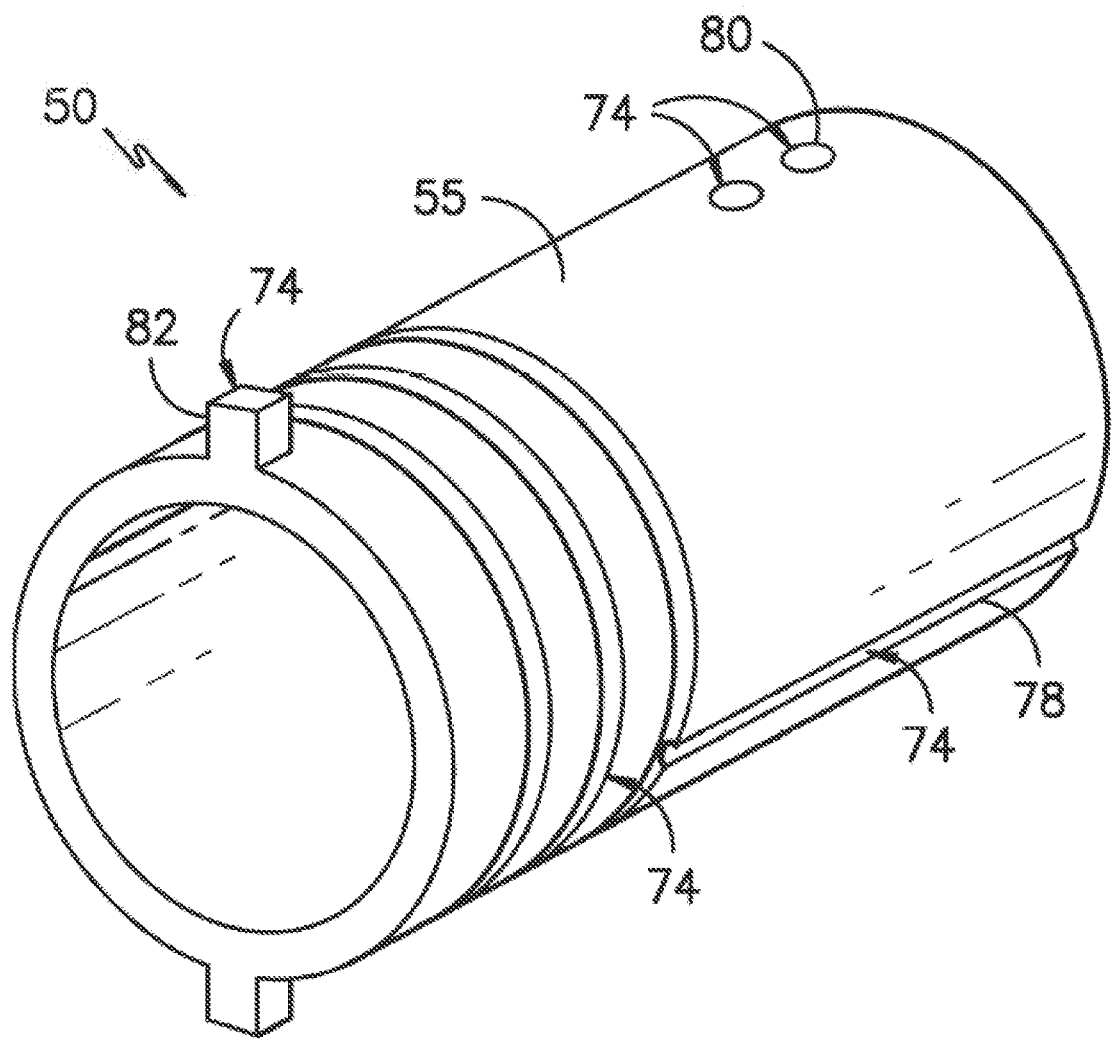
FIG. -7-

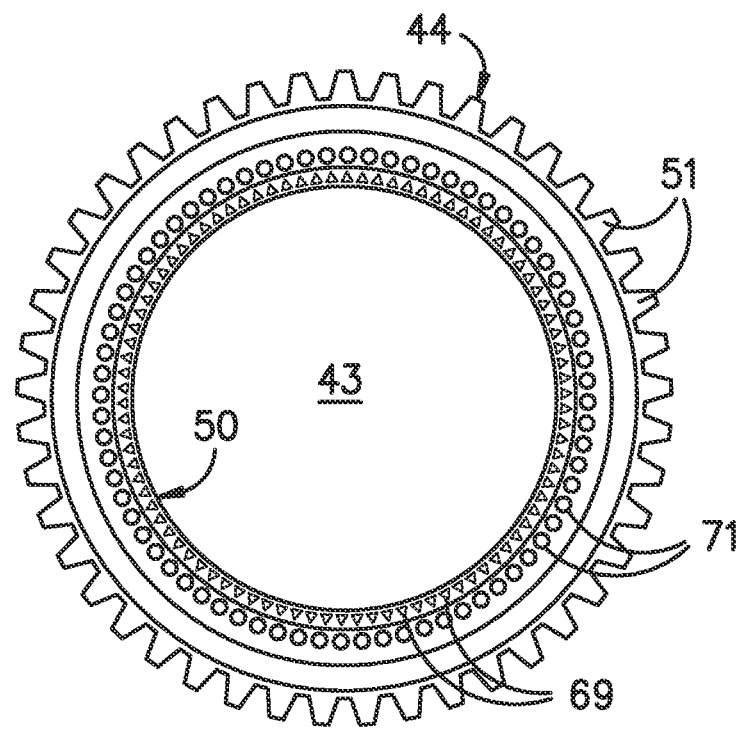
FIG. -8-
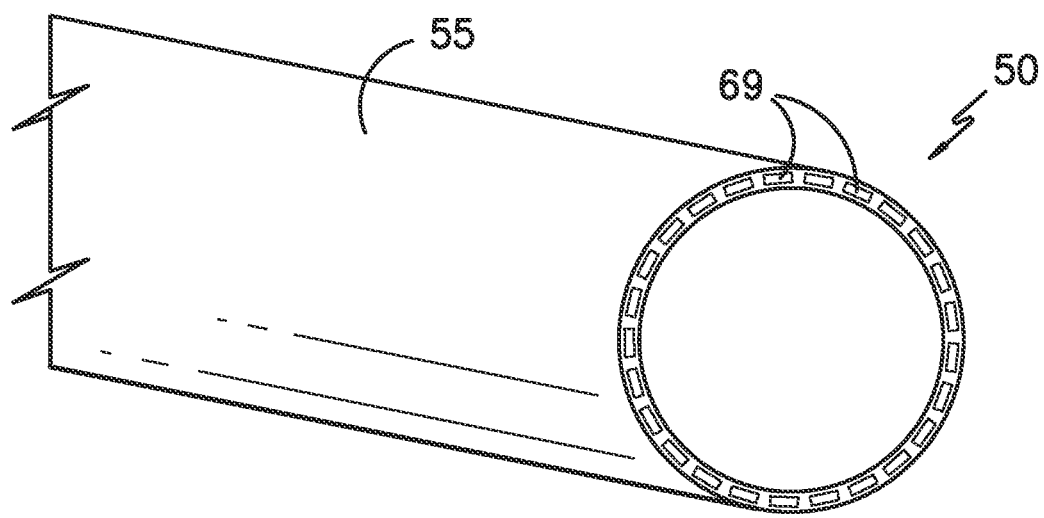
FIG. -9-

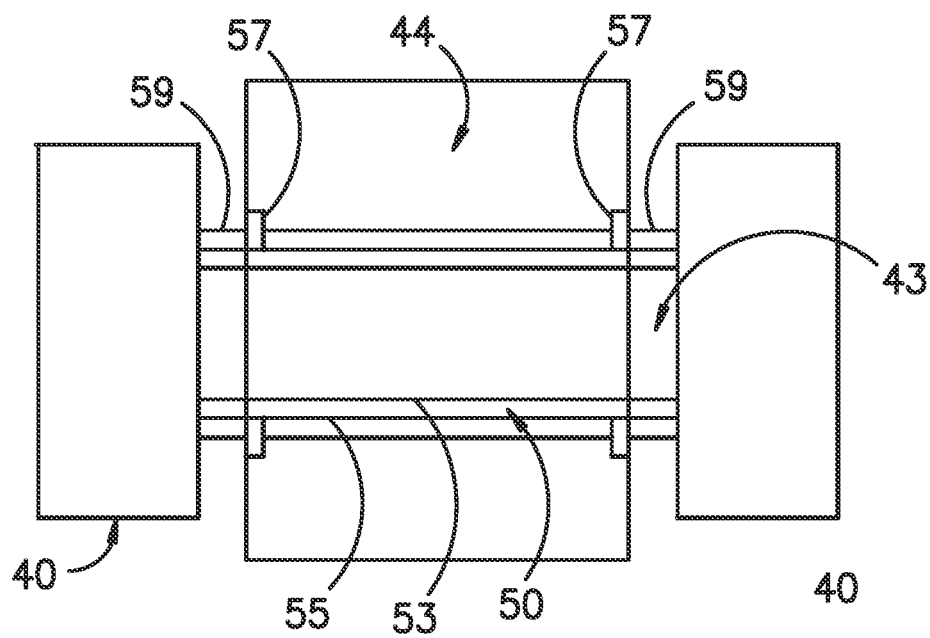
FIG. -10-
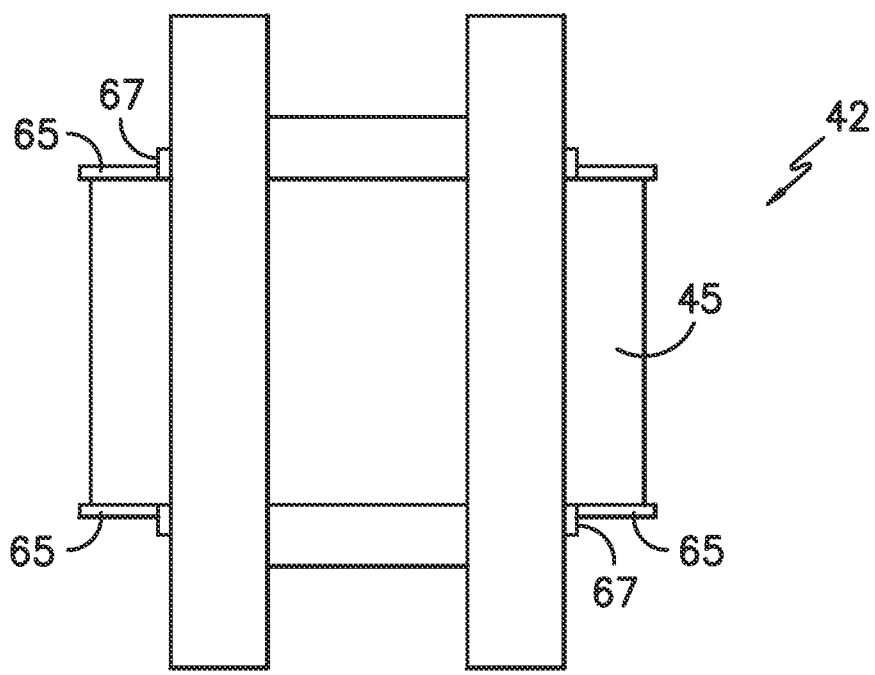
FIG. -11-

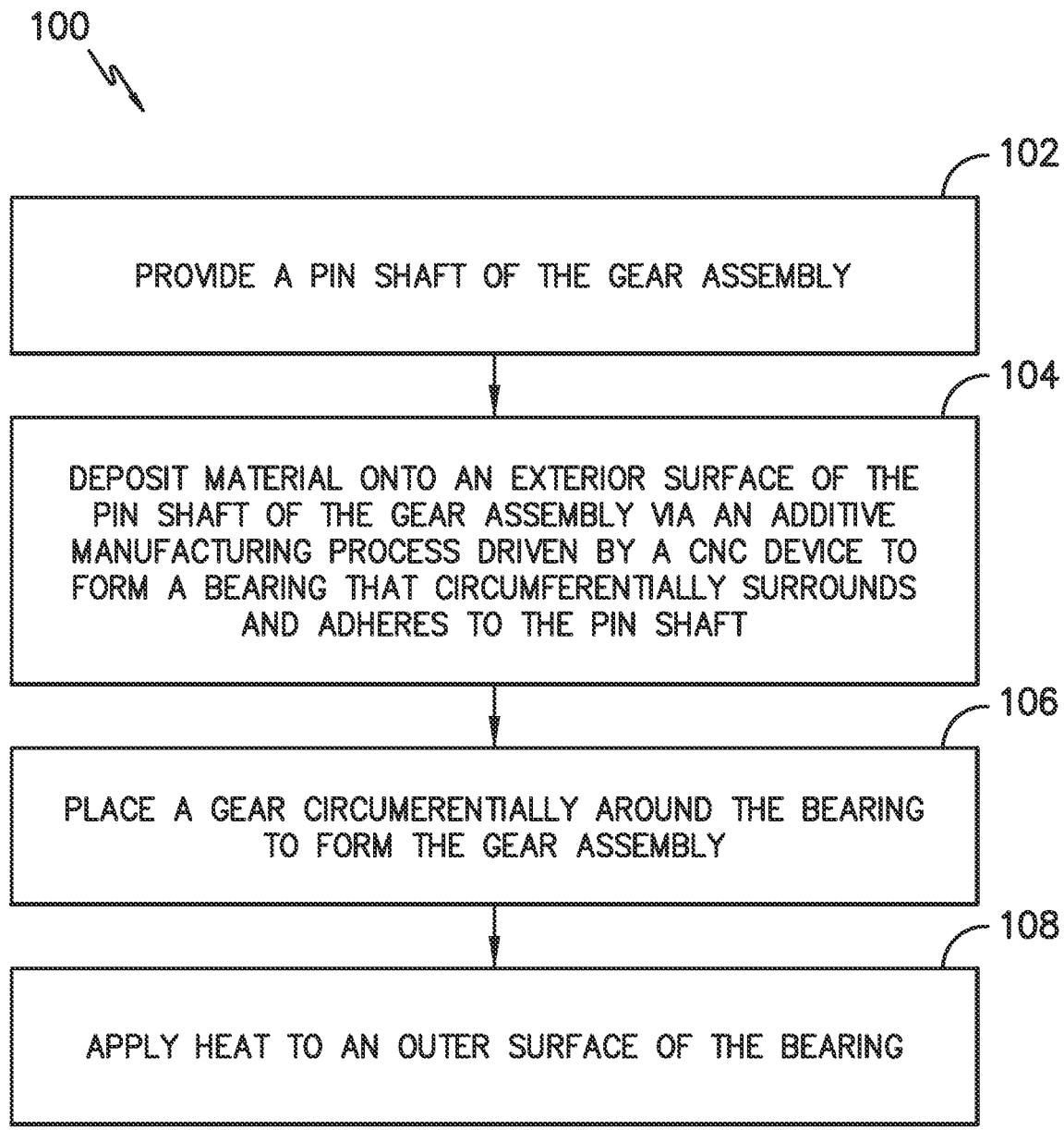
FIG. -12-

ADDITIVELY MANUFACTURED JOURNAL BEARING FOR A WIND TURBINE GEARBOX

FIELD

The present disclosure relates in general to wind turbines, and more particularly to a journal bearing for a wind turbine gearbox constructed, at least in part, via additive manufacturing.

BACKGROUND

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

The gearbox generally includes a gearbox housing containing a plurality of gears (e.g., planetary, ring and/or sun gears as well as non-planetary gears) connected via one or more planetary carriers and bearings for converting the low speed, high torque input of the rotor shaft to a high speed, low torque output for the generator. In addition, each of the gears rotates about a pin shaft arranged within the one or more planetary carriers. Further, a journal bearing is generally positioned around each of the pin shafts between a respective pin shaft and a rotating gear. In addition, lubrication is generally provided between the journal bearing and the rotating gear.

Conventional journal bearings are typically fabricated by forming one or more stock materials into a cylindrical shape that can be mounted onto a respective pin shaft with an interference fit as well as a bolted assembly. As such, journal bearings are used as an interface between the hydrodynamic film generated from the lubrication between the stationary pin shaft and the rotating gear. Accordingly, the stock material(s) of the journal bearings can be optimized for load bearing capacity, compliance, and/or resistance to wear, scoring, seizing, etc. However, conventional gearbox journal bearings can require excessive machining and assembly steps. In addition, conventional journal bearings may also require additional material to resist the stresses generated from the interference fit with the pin shaft.

Accordingly, a gearbox assembly for a wind turbine having one or more journal bearings that address the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a method for manufacturing a gear assembly of a gearbox in a wind turbine. The method includes providing a pin shaft of the gear assembly. The method also includes depositing material onto an exterior surface of the pin shaft of the gear assembly via an additive manufacturing process driven by a computer numerical control (CNC) device to form a bearing that circumferentially surrounds and adheres to the pin shaft. Further, the method includes providing a gear circumferentially around the bearing to form the gear assembly.

In one embodiment, the step of depositing the material on the pin shaft of the gear assembly via the additive manufacturing process driven by the CNC device may include building up the material layer by layer on the pin shaft of the gear assembly via the additive manufacturing process. In particular embodiments, the additive manufacturing process may include, for example, metal wire transfer, electron beam melting, inertial welding, powder nozzle laser deposition, directed energy deposition, binder jetting, material jetting, laser cladding, cold spray deposition, directed energy deposition, powder bed fusion, material extrusion, direct metal laser sintering, direct metal laser melting, cold metal transfer, metal inert gas (MIG) welding, tungsten inert gas (TIG) welding, vat photopolymerisation, or any other suitable additive manufacturing process.

In another embodiment, the method may include applying heat to an outer surface of the bearing, e.g. via an energy source.

In further embodiments, the method may include forming at least one additional feature into at least one of an outer surface of the bearing, a cross-section of the bearing, an outer surface of the pin shaft, a cross-section of the gear, end faces of the gear, and/or an inner surface of the gear via the additive manufacturing process. More specifically, in certain embodiments, the additional feature(s) may include an oil path, one or more ribs, one or more structural supports, an alignment feature, a cooling channel, an inspection path, a signal wiring path, a spacer, a sensor recess, or any other feature that can be formed via additive manufacturing. For example, in one embodiment, the method may include forming the oil path to have a helical shape into the outer surface of the bearing. In another embodiment, the method may also include forming a plurality of additional features, with at least one of the plurality of additional features having a greater thickness than remaining additional features.

In additional embodiments, the CNC device may include a controller communicatively coupled to a robotic arm that deposits the material onto the exterior surface of the pin shaft. In such embodiments, the controller is configured to control at least two axes of rotation so as to move and/or rotate the pin shaft in multiple directions.

In several embodiments, an interface between the pin shaft and the bearing is absent of mechanical fasteners. In yet another embodiment, the bearing may include a journal bearing and the gear may include a planet gear of the gearbox.

In another aspect, the present disclosure is directed to a gearbox assembly. The gearbox assembly includes a gearbox housing and a gear assembly configured within the gearbox housing. The gear assembly includes a plurality of planet gears each rotatably mounted to a respective pin shaft via a bearing. The bearings are mounted to each of the pin shafts and secured thereto via a circumferential bond. More specifically, the circumferential bond includes an adhesion bond, a fusion bond, and/or a metallurgical bond. The gearbox assembly further includes at least one sun gear and at least one ring gear. As such, the plurality of planet gears re engaged with the ring gear and configured to rotate about the sun gear. In addition, the gearbox assembly includes at least one carrier operatively coupled with the pin shafts. It should also be understood that the gearbox assembly may further include any of the additional features described herein.

In yet another aspect, the present disclosure is directed to a method for manufacturing a gear assembly of a gearbox in a wind turbine. The method includes providing a carrier of the gear assembly having a body and at least one shaft extending therefrom. Further, the carrier includes at least one of a first stage carrier and a second stage carrier. The method also includes depositing material onto an exterior surface of the shaft of the carrier of the gear assembly via an additive manufacturing process driven by a computer numerical control (CNC) device to form a journal bearing that circumferentially surrounds and adheres to the shaft. In one embodiment, the method may further include forming at least one additional feature adjacent to the journal bearing between the journal bearing and the body of the carrier. In addition, the additional feature(s) has a greater thickness than a thickness of the journal bearing so as to is configured to withstand thrust loads of the gearbox. It should also be understood that the method may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a detailed, internal view of one embodiment of a nacelle of a wind turbine according to the present disclosure;

FIG. 3 illustrates a cross-sectional view of one embodiment of a gearbox assembly of a wind turbine according to the present disclosure;

FIG. 4 illustrates a perspective view of one embodiment of a gear assembly of a gearbox of a wind turbine according to the present disclosure;

FIG. 5 illustrates a side, cross-sectional view of one embodiment of a gear assembly of a gearbox of a wind turbine according to the present disclosure;

FIG. 6 illustrates a schematic diagram of one embodiment of a computer numerical control (CNC) device according to the present disclosure;

FIG. 7 illustrates a perspective view of one embodiment of a journal bearing manufactured according to the present disclosure; and FIG. 8 illustrates a front view of one embodiment of a gear assembly of a gearbox of a wind turbine according to the present disclosure, particularly illustrating various additive-enabled structures formed in the pin shaft and the journal bearing;

FIG. 9 illustrates a perspective view of another embodiment of a journal bearing manufactured according to the present disclosure, particularly illustrating various additive-enabled structures formed in the journal bearing;

FIG. 10 illustrates a simplified side view of yet another embodiment of a gear assembly of a gearbox of a wind turbine according to the present disclosure, particularly illustrating various additive-enabled structures formed thereon;

FIG. 11 illustrates a simplified side view of one embodiment of a second-stage carrier of a gearbox of a wind turbine according to the present disclosure particularly illustrating various additive-enabled structures formed thereon;

FIG. 12 illustrates a flow diagram of one embodiment of a method for manufacturing a gear assembly of a gearbox of a wind turbine according to the present disclosure.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a gear assembly that includes one or more journal bearings formed via additive manufacturing and methods of manufacturing same. It should be understood that the pin shafts and/or carrier shafts described herein are meant to encompass any shafts within the gearbox, including pin shafts at planetary stages as well as non-planetary stages (e.g. helical stages) and first and second stages (or so on) of the gearbox. In one aspect, the method includes providing a pin or carrier shaft of the gear assembly. Further, the method includes depositing material onto an exterior surface of the shaft via an additive manufacturing process driven by a CNC device to form the journal bearing that circumferentially surrounds and adheres to the shaft. Moreover, the method includes providing a gear circumferentially around the additive-manufactured bearing to form the gear assembly.

Thus, the present disclosure provides many advantages not present in the prior art. For example, the methods of the present disclosure create an adhesion, fusion, or metallurgical circumferential bond between the pin or carrier shaft and the journal bearing material. Such bonding eliminates the need for mechanical fasteners, thereby reducing the interference stresses. In addition, the methods and bearings of the present disclosure enable a smaller envelope for the gear assembly, use less material, have a reduced weight, and require less machining and/or assembly time. The journal bearings described herein can also be optimized with multiple materials as needed, i.e. by adding different materials in different areas based on estimated stresses, etc. Moreover, the CNC device can be programmed to complete the manufacturing process that provides additional productivity benefits and repeatability relative to a manual process. Further, the journal bearings of the present disclosure can be hardened by simply heating the surface of the bearing, for example, with a concentrated and/or amplified energy or light source, rather than requiring the entire bearing to be heat treated. As such, the methods of the present disclosure can improve the overall process speed and/or automation.

Referring now to the drawings, FIG. 1 illustrates a perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. For example, as shown in FIG. 2, the turbine controller 26 is disposed within a control cabinet mounted to a portion of the nacelle 16. However, it should be appreciated that the turbine controller 26 may be disposed at any location on or in the wind turbine 10, at any location on the support surface 14 or generally at any other location. In general, the turbine controller 26 may be configured to transmit and execute wind turbine control signals and/or commands in order to control the various operating modes (e.g., startup or shut-down sequences) and/or components of the wind turbine 10.

Referring now to FIG. 2, a simplified, internal view of a nacelle 16 of the wind turbine 10 according to conventional construction is illustrated. As shown, the generator 24 may be disposed within the nacelle 16. In general, the generator 24 may be coupled to the rotor 18 of the wind turbine 10 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox assembly 36. As is generally understood, the rotor shaft 32 may provide a low speed, high torque input to the gearbox assembly 36 in response to rotation of the rotor blades 22 and the hub 20. The gearbox assembly 36 may then be configured to convert the low speed, high torque input to a high speed, low torque output to drive the generator shaft 34 and, thus, the generator 24. In alternative embodiments, the rotor shaft 32 may be eliminated and the rotatable hub 20 may be configured to turn the gears of the gearbox assembly 36, rather than requiring a separate rotor shaft 32.

Referring now to FIG. 3, a cross-sectional view of a gearbox assembly 36 according to the present disclosure is illustrated. As shown, the gearbox assembly 36 includes a gear assembly 38, such as a gear assembly, housed within a gearbox housing 37. More specifically, the gear assembly 38 includes a plurality of gears (e.g., planetary, ring, sun, helical, and/or spur gears) and bearings 39 for converting the low speed, high torque input of the rotor shaft 32 to a high speed, low torque output for the generator 24. For example, as shown, the input shaft 32 may provide an input load to the gear assembly 38 and the system 38 may provide an output load to the generator 24 (FIG. 2) as is generally known in the art. Thus, during operation, input load at an input rotational speed is transmitted through the gear assembly 38 and provided as output load at output rotational speed to the generator 24.

Further, the gear assembly 38 includes a first planetary carrier 40 and a second planetary carrier 42 operatively coupling a plurality of gears. Further, as shown, the gear assembly 38 includes, at least, a ring gear 41, one or more planet gears 44, a sun gear 46, one or more first pin shafts 43, and one or more second pin shafts 45. For example, in several embodiments, the gear assembly 38 may include one, two, three, four, five, six, seven, eight, or more planet gears 44. Further, each of the gears 41, 44, 46 includes a plurality of teeth. For example, as shown in FIG. 8, the planet gear 44 includes a plurality of gear teeth 51. The teeth are sized and shaped to mesh together such that the various gears 41, 44, 46 engage each other. For example, the ring gear 41 and the sun gear 46 may each engage the planet gears 44. In addition, it should be understood that the gears 41, 44, 46 described herein may include any suitable type of gears, including but not limited to spur gears, face gears, helical gears, double helical gears, or similar.

In some embodiments, one or both of the planetary carriers 40, 42 may be stationary. In these embodiments, the input shaft 32 may be coupled to the ring gear 41, and input loads on the input shaft 32 may be transmitted through the ring gear 41 to the planet gears 44. Thus, the ring gear 41 may drive the gear assembly 38. In other embodiments, the ring gear 41 may be stationary. In these embodiments, the input shaft 32 may be coupled to the planetary carriers 40, 42, and input loads on the input shaft 32 may be transmitted through the planetary carriers 40, 42 to the planet gears 44. Thus, the planetary carriers 40, 42 may drive the gear assembly 38. In still further embodiments, any other suitable component, such as the planet gear 44 or the sun gear 46, may drive the gear assembly 38.

Still referring to FIG. 3, the sun gear 46 defines a central axis 49, and thus rotates about this central axis 49. The ring gear 41 may at least partially surround the sun gear 46, and be positioned along the central axis 49. Further, the ring gear 41 may (if rotatable) thus rotate about the central axis 49. Each of the planet gears 44 may be disposed between the sun gear 46 and the ring gear 41, and may engage both the sun gear 46 and the ring gear 41. For example, the teeth of the gears may mesh together, as discussed above. Further, each of the planet gears 44 may define a central planet axis 48, as shown. Thus, each planet gear 44 may rotate about its central planet axis 48. Additionally, the planet gears 44 and central planet axes 48 thereof may rotate about the central axis 49.

The gearbox assembly 36 may also include a lubrication system or other means for circulating oil throughout the gearbox components. For example, as shown in FIG. 3, the gearbox assembly 36 may include a plurality of oil passages 47 that are configured to transfer oil therethrough. As is generally understood, the oil may be used to reduce friction between the moving components of the gearbox assembly 36 and may also be utilized to provide cooling for such components, thereby decreasing component wear and other losses within the gearbox assembly 36 and increasing the lifespan thereof. In addition, the oil may contain properties that prevent corrosion of the internal gearbox components.

Referring now to FIGS. 4 and 5, partial, detailed views of the gear assembly 38 are illustrated. For example, FIG. 4 illustrates a partial, perspective view of the gear assembly 38, with a portion of one of the planet gears 44 removed to illustrate internal components thereof. FIG. 5 illustrates a partial, side view of the gear assembly 38. More specifically, as shown, the gear assembly 38 includes, at least, the pin shaft 43, a bearing 50 mounted circumferentially onto the pin shaft 43, and the planet gear 44 mounted circumferentially onto the bearing 50.

More specifically, in certain embodiments, the bearing 50 may correspond to a journal bearing. Accordingly, in certain embodiments, the bearing 50 may be formed directly onto the pin shaft 43, e.g. via an additive manufacturing process. In such embodiments, as shown, an interface between the pin shaft 43 and the bearing 50 may be absent of mechanical fasteners, thereby simplifying the assembly. Rather, as shown, the bearings 50 of the present disclosure may be mounted to each of the pin shafts 43, 45 and secured thereto via a circumferential bond 52. More specifically, as shown, the circumferential bond 52 may include an adhesion bond, a fusion bond, and/or a metallurgical bond spending on the type of additive manufacturing process used to build up the bearing material. Thus, the bond 52 replaces conventional fasteners of prior art assemblies and eliminates interference stresses, thereby enabling a smaller space envelope. In addition, the gear assembly 38 of the present disclosure requires less material/weight and reduces machining and assembly time for the journal bearing.

In certain embodiments, the bearing material may include various metals or metal alloys, including, for example, a copper alloy (e.g. bronze). Thus, the bearing material may provide improved wear characteristics under loading (especially at startup and shutdown, when an oil film may be insufficient to separate the rotating and non-rotating surfaces). In addition, in particular embodiments, the bearing material can be thinner than conventional bearings (e.g. from about 1 millimeter (mm) to about 5 mm as opposed to 10-15 mm).

As used herein, additive manufacturing generally refers to processes used to create a three-dimensional object in which layers of material are deposited or formed under computer control to create an object. More specifically, the additive manufacturing processes described herein may include metal wire transfer, electron beam melting, inertial welding, powder nozzle laser deposition, directed energy deposition, binder jetting, material jetting, laser cladding, cold spray deposition, directed energy deposition, powder bed fusion, material extrusion, direct metal laser sintering, direct metal laser melting, cold metal transfer, metal inert gas (MIG) welding, tungsten inert gas (TIG) welding, vat photopolymerisation, or any other suitable additive manufacturing process now known or developed in the future. Thus, in one embodiment, bearing material may be deposited onto the respective pin shafts(s) 43, 45 layer by layer via a computer numerical control (CNC) device 54 to build up the bearing 50 via an additive manufacturing process driven.

Referring particularly to FIG. 6, the CNC device 54 may include a controller 56 communicatively coupled to a robotic arm 58 that deposits the bearing material onto an exterior surface 53 of the pin shaft 43. In such embodiments, the controller 56 is configured to control at least two axes 60, 62 of rotation of the pin shaft 43. More specifically, as shown, the robotic arm 58 may be configured to move along three axes 60, 62, 63. Further, as shown, the CNC device 54 may include a bed 64 configured to receive and secure one of the pin shafts 43, 45 in place. More specifically, as shown, the bed 64 may include a pin holder 65 for holding one of the pin shaft(s) 43, 45 in place. Thus, the robotic arm 58 can maneuver around the secured pin shaft(s) 43, 45 as needed so as to build up the bearing material on the exterior surface 53 thereof.

In addition, as shown, the controller 56 may include one or more processor(s) 66 and associated memory device(s) 68 configured to perform a variety of computer-implemented functions (e.g., performing the methods, steps, calculations and the like and storing relevant data as disclosed herein). Additionally, the controller 56 may also include a communications interface 70 to facilitate communications between the interface 70 and the various components of the CNC device 54. Further, the communications module 68 may include a sensor interface 72 (e.g., one or more analog-to-digital converters) to permit signals transmitted from one or more sensors to be converted into signals that can be understood and processed by the processor(s) 66. It should be appreciated that the sensors (not shown) may be communicatively coupled to the communications interface 70 using any suitable means. For example, as shown in FIG. 6, the sensors may be coupled to the sensor interface 72 via a wired connection. However, in other embodiments, the sensors may be coupled to the sensor interface 72 via a wireless connection, such as by using any suitable wireless communications protocol known in the art. As such, the processor 66 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 66 is also configured to compute advanced control algorithms and communicate to a variety of Ethernet or serial-based protocols (Modbus, OPC, CAN, etc.). Additionally, the memory device(s) 68 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 68 may generally be configured to store suitable computer-readable instructions that, when implemented by the processor(s) 66, configure the controller 56 to perform the various functions as described herein.

Referring now to FIGS. 7-11, the CNC device 54 may also be configured to form or print at least one additional feature 74 into or on an outer surface 55 of the bearing(s) 50, as well as into or on an inner surface of one of the planet gears 44 via any suitable additive manufacturing process. More specifically, in certain embodiments, the additional feature 74 may include an oil path (e.g. an oil supply path, an oil drain (removal) path, an oil distribution manifold, an oil collection channel, an oil buffer, and/or similar), one or more ribs, one or more structural supports, an alignment feature, a cooling channel, an inspection path, a signal wiring path, one or more recesses, or any other features that can be easily printed or formed therein. For example, as shown in FIG. 7, the additional feature 74 may correspond to an oil path having a helical shape that is formed into the outer surface 55 of the bearing 50. It should be further understood that the oil path may have any other suitable shapes as desired. In another embodiment, as shown in FIGS. 8 and 9, it is also possible to add additive features onto or into the pin shaft(s) 43, 45 and/or the journal bearing 50 for desired flexibility/stiffness, weight reduction, cooling and/or other related purposes desired for the application. More specifically, FIG. 8 illustrates a journal bearing 50 having a plurality of additive-enabled features 69 formed into the cross-section thereof. In addition, as shown, the gear 44 may also include a plurality of additive-enabled features 71 formed onto an inner surface of the bore thereof. Further, as shown in FIG. 9, another embodiment of the journal bearing 50 having a plurality of additive-enabled features 69 with a different shape formed into the cross-section is illustrated.

Accordingly, it should be understood that any suitable features may be easily formed into the bearing 50 and/or the pin shaft(s) 43, 45 to locally increase stiffness where desired and/or to provide desired material properties. For example, in certain embodiments, as shown in FIG. 7, the additional additive-enabled feature(s) may also include a signal wiring path 78 and/or a sensor recess configured to receive a sensor or probe. Thus, in such embodiments, a sensor wire and associated sensor can be positioned adjacent to the pin shaft(s) 43, 45. Further, the additional feature(s) 74 may include an inspection path 80 or probe recess configured to receive a proximity sensor (e.g. an inductive, infrared or ultrasonic sensor) that can take measurements indicative of various stresses of the gear assembly 38. In additional embodiments, the additional feature(s) 74 may include an alignment feature 82 that can assist in aligning the gear 44 on the pin shaft(s) 43, 45. It should be understood that the additional feature(s) 74 may further include any other features that can be easily printed or formed into the bearing(s) 50 during the additive manufacturing process. It should also be understood that the additive-enabled features provided herein may be three-dimensional structures and/or may follow a three-dimensional path. In addition, the additive-enabled features may be internal or external to the exposed journal surface. As such, externally-exposed voids formed via additive manufacturing may be used to maintain oil in contact with the journal bearing surface.

Referring particularly to FIG. 10, the gear assembly 38 may also include one or more additive-enabled features 57 printed on side faces of the planet gear 44. More specifically, as shown, the additive-enabled features 57 may be printed to have a greater thickness than the printed journal bearing 50. As such, as shown, the illustrated additive-enabled features 57 are configured to withstand residual thrust loads. In addition, as shown, the gear assembly 38 may further include one or more additive-enabled features 59 printed on the journal bearing 50, i.e. between the carrier 40 and the planet gear 44. Thus, as shown, the illustrated additive-enabled features 59 are also configured to withstand residual thrust loads.

Referring particularly to FIG. 11, it should be further understood that the journal bearing 50 described herein may also be utilized with additional components of the gear assembly 38 (i.e. in addition to the gear assembly 38). For example, as shown, the second-stage carrier 42 may also include one or more additive-enabled features 65, 67 printed thereon. More specifically, as shown, additive-enabled features 65 represents additional locations for the printed journal bearing 50 described herein, whereas additive-enabled features 67 represents printed features that can be printed adjacent to the journal bearing 50 to have a greater thickness so as to withstand residual thrust loads.

Referring now to FIG. 12, a flow diagram of a specific embodiment of a control algorithm 100 that may be executed for manufacturing a gear assembly of a gearbox in a wind turbine is illustrated in accordance with aspects of the present subject matter. In general, the control algorithm 100 will be described herein with reference to the gear assembly 38 shown in FIG. 3-5. However, in other embodiments, the algorithm 100 may be used in connection with any other suitable implement having any other suitable implement configuration and/or with any other suitable system having any other suitable system configuration.

It should be appreciated that, although FIG. 12 depicts control steps or functions performed in a particular order for purposes of illustration and discussion, the control algorithms discussed herein are not limited to any particular order or arrangement. One skilled in the art, using the disclosures provided herein, will appreciate that various steps or functions of the algorithms disclosed herein can be omitted, rearranged, combined, and/or adapted in various ways without deviating from the scope of the present disclosure.

As shown at 102, the method 100 includes providing a pin shaft 43, 45 of the gear assembly 38. As shown at 104, the method 100 includes depositing material onto an exterior surface of the pin shaft 43, 45 of the gear assembly 38 via an additive manufacturing process driven by the CNC device 54 to form a bearing 50 that circumferentially surrounds and adheres to the pin shaft 43, 45. As shown at 106, the method 100 includes providing a gear 44, such as one of the planet gears 44, circumferentially around the bearing 50 to form the gear assembly 38. In further embodiments, as shown at 108, the method 100 may optionally include applying heat to the outer surface 55 of the bearing 50, e.g. via any suitable energy source, so as to harden the bearing 50. For example, in particular embodiments, the energy source may include a light source, a photon source, an electron source, and/or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a gear assembly of a gearbox in a wind turbine, the method comprising:
   providing a pin shaft of the gear assembly;
   depositing at least one material onto an exterior surface of the pin shaft of the gear assembly via an additive manufacturing process driven by a computer numerical control (CNC) device to form a bearing that circumferentially surrounds and adheres to the pin shaft; and,
   providing a gear circumferentially around the bearing to form the gear assembly,
   wherein the CNC device comprises a controller communicatively coupled to a robotic arm configured to deposit the material onto the exterior surface of the pin shaft, the controller configured to control at least two axes of rotation of the pin shaft.

2. The method of claim 1, wherein depositing the material on the pin shaft of the gear assembly via the additive manufacturing process driven by the CNC device further comprises building up the material layer by layer on the pin shaft of the gear assembly via the additive manufacturing process.

3. The method of claim 2, wherein the additive manufacturing process comprises at least one of metal wire transfer, electron beam melting, inertial welding, powder nozzle laser deposition, directed energy deposition, binder jetting, material jetting, laser cladding, cold spray deposition, directed energy deposition, powder bed fusion, material extrusion, direct metal laser sintering, direct metal laser melting, cold metal transfer, metal inert gas (MIG) welding, tungsten inert gas (TIG) welding, or vat photopolymerisation.

4. The method of claim 1, further comprising applying heat to an outer surface of the bearing via an energy source.

5. The method of claim 1, further comprising forming at least one additional feature into at least one of an outer surface of the bearing, a cross-section of the bearing, an outer surface of the pin shaft, a cross-section of the gear, end faces of the gear, or an inner surface of the gear via the additive manufacturing process.

6. The method of claim 5, wherein the at least one additional feature comprises at least one of an oil path, one or more ribs, one or more structural supports, an alignment feature, a cooling channel, an inspection path, a signal wiring path, a spacer, or a sensor recess.

7. The method of claim 6, further comprising forming a plurality of the additional features, at least one of the plurality of additional features having a greater thickness than remaining additional features.

8. The method of claim 6, further comprising forming the oil path to have a helical shape into the outer surface of the bearing.

9. The method of claim 1, wherein an interface between the pin shaft and the bearing is absent of mechanical fasteners.

10. The method of claim 1, wherein the bearing comprises a journal bearing and the gear comprises a planet gear of the gearbox.

11. A method for manufacturing a gear assembly of a gearbox in a wind turbine, the method comprising:
    providing a carrier of the gear assembly having a body and at least one shaft extending therefrom, the carrier comprising at least one of a first stage carrier and a second stage carrier; and,
    depositing material onto an exterior surface of the shaft of the carrier of the gear assembly via an additive manufacturing process driven by a computer numerical control (CNC) device to form a journal bearing that circumferentially surrounds and adheres to the shaft,
    wherein the CNC device comprises a controller communicatively coupled to a robotic arm configured to deposit the material onto the exterior surface of the pin shaft, the controller configured to control at least two axes of rotation of the pin shaft.

12. The gearbox assembly of claim 11, further comprising forming at least one additional feature adjacent to the journal bearing between the journal bearing and the body of the carrier, the at least one additional feature comprising a greater thickness than a thickness of the journal bearing so as to withstand thrust loads of the gearbox.

* * * * *